United States Patent
Li et al.

(10) Patent No.: US 9,977,178 B2
(45) Date of Patent: May 22, 2018

(54) BACKLIGHT SOURCE AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Donglei Li, Beijing (CN); Zhishuai Jia, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 99 days.

(21) Appl. No.: 15/092,021

(22) Filed: Apr. 6, 2016

(65) Prior Publication Data

US 2016/0299287 A1    Oct. 13, 2016

(30) Foreign Application Priority Data

Apr. 10, 2015 (CN) .......................... 2015 1 0171089

(51) Int. Cl.
*G02B 6/00* (2006.01)
*F21V 8/00* (2006.01)
*G02F 1/13357* (2006.01)

(52) U.S. Cl.
CPC .......... *G02B 6/0091* (2013.01); *G02B 6/002* (2013.01); *G02B 6/005* (2013.01); *G02B 6/0055* (2013.01); *G02B 6/0085* (2013.01)

(58) Field of Classification Search
CPC ...................................... G02B 6/0081–6/0096
See application file for complete search history.

(56) References Cited

U.S. PATENT DOCUMENTS 8,794,779 B2 * 8/2014 Hayashi ............... G02B 6/0091
362/612
2010/0128465 A1 * 5/2010 Byoun ................. G02B 6/0091
362/97.1

(Continued)

FOREIGN PATENT DOCUMENTS

CN    1752807 A    3/2006
CN  103090275 A    5/2013

(Continued)

OTHER PUBLICATIONS

Office Action in Chinese Patent Application No. 201510171089.2, dated Aug. 5, 2016.

(Continued)

*Primary Examiner* — Mariceli Santiago
(74) *Attorney, Agent, or Firm* — Brooks Kushman P.C.

(57) ABSTRACT

The present disclosure provides a backlight source and a display device. A rigid element is arranged between a light strip of the backlight source and a light-entering surface of a light guide plate. One end of the rigid element is fixed onto the light strip, and the other end of the right element is fixed onto the light guide plate, so as to maintain a constant distance between the light strip and the light-entering surface of the light guide plate. An elastic element is arranged between the light strip and a back plate and at a side of the light strip opposite to the light-entering surface of the light guide plate. When the light guide plate is thermally deformed, a deformation force generated by the light guide plate is applied to the rigid element, so push the light strip to press against the elastic element.

19 Claims, 3 Drawing Sheets

(56) References Cited

U.S. PATENT DOCUMENTS

| | | | | |
|---|---|---|---|---|
| 2011/0149602 A1* | 6/2011 | Lee | ............... | G02B 6/0091 |
| | | | | 362/612 |
| 2011/0304795 A1* | 12/2011 | Lee | ............... | G02B 6/0091 |
| | | | | 349/62 |
| 2012/0281151 A1* | 11/2012 | Abe | ............... | G02B 6/0091 |
| | | | | 348/739 |
| 2013/0094241 A1* | 4/2013 | Yu | ............... | G02B 6/0091 |
| | | | | 362/602 |
| 2015/0247967 A1* | 9/2015 | Horiuchi | ............ | G02B 6/0085 |
| | | | | 362/611 |

FOREIGN PATENT DOCUMENTS

| | | |
|---|---|---|
| CN | 103792718 A | 5/2014 |
| CN | 103836457 A | 6/2014 |
| JP | 2012-146504 A | 8/2012 |
| KR | 2013-0046496 A | 5/2013 |
| KR | 2013-0110964 A | 10/2013 |

OTHER PUBLICATIONS

Third Office Action for Chinese Application No. 201510171089.2, dated Aug. 2, 2017, 5 Pages.

\* cited by examiner

BACKLIGHT SOURCE AND DISPLAY DEVICE

CROSS-REFERENCE TO RELATED APPLICATION

The present application claims a priority of the Chinese patent application No. 201510171089.2 filed on Apr. 10, 2015, which is incorporated herein by reference in its entirety.

TECHNICAL FIELD

The present disclosure relates to the field of display technology, in particular to a backlight source and a display device.

BACKGROUND

Liquid crystal itself is non-luminous, and for a liquid crystal display (LCD) device such as a liquid crystal television, an external backlight source needs to be provided so as to display an image. Depending on its arrangement position, the backlight source includes an edge-type one and a direct-type one. The former has been widely used in small-size LCD devices due to its advantages such as fewer light-emitting elements being required, low production cost and small thickness.

For the edge-type backlight source, its light strips are arranged at a side surface of a light guide plate, and the smaller a distance between the light strip and the light guide plate, the higher a light efficiency of a light beam entering the light guide plate. Along with an increase in a size of the backlight source, more heat may be generated by the light strips, so the light guide plate may easily be expanded due to the generated heat. During the thermal expansion, when the light guide plate is pressed and deformed, the quality of the backlight source will be adversely affected. In order to provide sufficient room for the thermal expansion of the light guide plate, it is necessary to increase the distance between the light strip and the light guide plate. Hence, there is a conflict between providing sufficient room for the thermal expansion and having a high light efficiency.

SUMMARY

An object of the present disclosure is to provide a backlight source, so as to resolve the above-mentioned conflict on the design of the distance between the light strip and the light guide plate. Another object of the present disclosure is to provide a display device so as to improve the product quality.

In one aspect, the present disclosure provides in some embodiments a backlight source, including a back plate, a light strip and a light guide plate which are arranged on the back plate. The light guide plate includes a light-exiting surface and a light-entering surface adjacent to the light-exiting surface. The light strip is arranged adjacent to the light-entering surface of the light guide plate, and a light beam from the light strip passes through the light-entering surface, enters the light guide plate and exits the light-exiting surface. A rigid element is arranged between the light strip and the light-entering surface of the light guide plate. One end of the rigid element is fixed onto the light strip, and the other end of the rigid element is fixed onto the light guide plate, so as to maintain a constant distance between the light strip and the light-entering surface of the light guide plate. An elastic element is arranged between the light strip and the back plate and at a side of the light strip opposite to the light-entering surface of the light guide plate. When the light guide plate is thermally deformed, a deformation force generated by the light guide plate is applied to the rigid element so as to push the light strip to press against the elastic element.

Alternatively, the backlight source further includes a heat dissipation plate arranged on the back plate and including a first section arranged between the light strip and the back plate. The light strip is fixed onto the first section of the heat dissipation plate, and the elastic element is arranged between the back plate and the first section of the heat dissipation plate.

Alternatively, the backlight source further includes a fixation assembly configured to fix the heat dissipation plate, so as to prevent the heat dissipation plate from being disengaged from the back plate.

Alternatively, the heat dissipation plate further includes a second section arranged on the back plate in a contact manner, and a via-hole is arranged in the back plate at a position corresponding to be second section. The fixation assembly includes a delimiting column fixed onto the second section and a fixation member fixed onto a top end of the delimiting column. The delimiting column is arranged at a position corresponding to the via-hole and passes through the via-hole. The top end of the delimiting column is located at a side of the back plate away from the heat dissipation plate. The fixation member is fit to a shape of the via-hole and configured to fix the delimiting column within the via-hole. When the light guide plate is thermally deformed, the deformation force generated by the light guide plate is applied to the rigid element so as to push the heat dissipation plate, thereby to push the delimiting column to move within the via-hole.

Alternatively, the light guide plate is arranged on the second section of the heat dissipation plate.

Alternatively, the fixation member is a nut, and the top end of the delimiting column is externally threaded so as to be fit to the nut.

Alternatively, the elastic element is a spring or an elastic sheet.

Alternatively, the rigid element is a metal spacer.

Alternatively, the backlight source further includes an optical membrane arranged at a side of the light-exiting surface of the light guide plate, and a reflector arranged at a side of the light guide plate opposite to the light-exiting surface.

Alternatively, the delimiting column and the heat dissipation plate are formed integrally.

In another aspect, the present disclosure provides in some embodiments a display device including the above-mentioned backlight source.

According to the embodiments of the present disclosure, the rigid element is arranged between the light strip and the light-entering surface of the light guide plate. One end of the rigid element is fixed onto the light strip, and the other end is fixed onto the light guide plate, so as to maintain a constant distance between the light strip and the light-entering surface of the light guide plate, thereby to ensure the light efficiency of the backlight source. In addition, the elastic element is arranged between the light strip and the back plate and at a side of the light strip opposite to the light-entering surface of the light guide plate. When the light guide plate is thermally deformed, the deformation force generated by the light guide plate is applied to the rigid element, so as to push the light strip to press against the elastic element, thereby to enable the elastic element to be deformed. As a result, it is able to provide sufficient room for the thermal expansion of the light guide plate while ensuring the high light efficiency, thereby to improve the quality of the backlight source as well as the quality of the display device.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments rely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
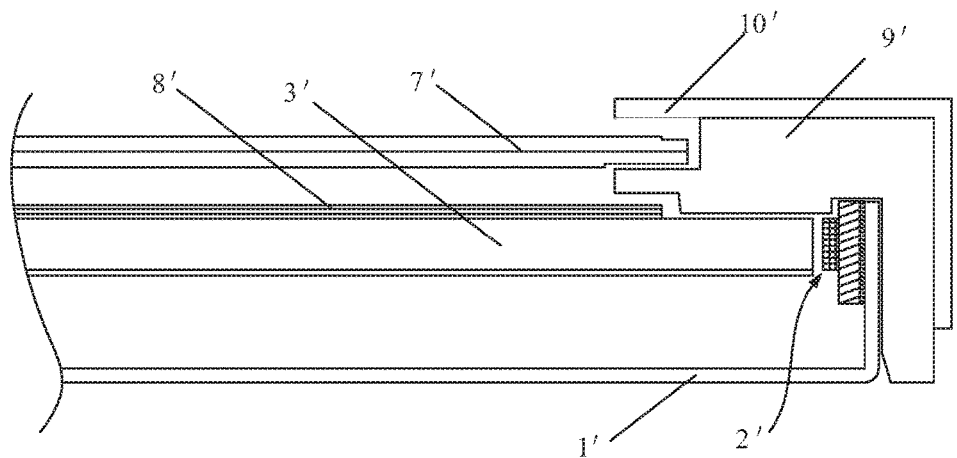
FIG. 1 is a topical, sectional view of an edge-type backlight source.

As shown in FIG. 1, which is a topical, sectional view of an edge-type backlight source, the backlight source includes, from bottom up, a back plate 1', a light guide plate 3' and an optical membrane 8' sequentially arranged on the back plate 1', a light strip 2' arranged adjacent to a side surface of the light guide plate 3', and a mold frame 9' configured to fix the light guide plate 3' and the optical membrane 8'. A display panel 7' is arranged on the mold frame 9', and then assembled with the backlight source through a front frame 10'. The light guide plate 3' functions as to allow a light beam to be transmitted from an end approximate to the light strip to an end away from the light strip. Dots are printed on a lower surface of the light guide plate 3' opposite to a light-exiting surface, so as to enable the light beams to exit the light-exiting surface uniformly, thereby to provide an area light source for the display panel.

Along with an increase in a size of the backlight source, a distance between the light strip 2' and the light guide plate 3' becomes larger and larger too, so as to provide sufficient room for the thermal expansion of the light guide plate 3'. The light guide plate 3' is usually made of a material having a thermal expansion coefficient of 0.00006 $K^{-1}$, and considering such factors as the water absorption, actually the light guide plate 3' has a maximum expansion rate of about 3%. Taking a 46-inch (1027.7 mm) light guide plate 3' as an example, its maximum expansion quantity is about 1027.7*0.003=3 min. Hence, it is necessary to provide sufficient room for the light guide plate 3', especially a dual-edge-type backlight source (where the light strips 2' are arranged at two opposite sides of the light guide plate 3'), and usually the distance between the light strip 2' and the light guide plate 3 is set as more than 1.5 mm. However, the larger the distance between the light strip 2' and the light guide plate 3', the lower the light efficiency. Further, when the distance between the light strip 2' and the light guide plate 3' is decreased, it is impossible to provide sufficient room for al expansion of the light guide plate 3', and thereby it is unable to prevent the light guide plate 3' from being deformed.

In order to overcome the above drawbacks, the present disclosure provides in some embodiments a backlight source, e.g., an edge-type backlight source. The backlight source includes a back plate, a light strip and a light guide plate which are arranged on the back plate. The light guide plate includes a light-exiting surface and a light-entering surface adjacent to the light-exiting surface. The light strip is arranged adjacent to the light-entering surface of the light guide plate. A rigid element is arranged between the light strip and the light-entering surface of the light guide plate. One end of the rigid element is fixed onto the light strip, and the other end of the rigid element is fixed onto the light guide plate, so as to maintain a constant distance between the light strip and the light-entering surface of the light guide plate. An elastic element is arranged between the light strip and the back plate and at a side of the light strip opposite to the light-entering surface of the light guide plate. When the light guide plate is thermally deformed, a deformation force generated by the light guide plate is applied to the rigid element so as to push the light strip to press against the elastic element, i.e., sufficient room for the thermal expansion of the light guide plate is provided through the elastic deformation of the elastic element.

According to the backlight source in the embodiments of the present disclosure, through the arrangement of the rigid element, it is able to ensure the high light efficiency, and through the elastic deformation of the elastic element, it is able to provide sufficient room for the thermal expansion of the light guide plate. As a result, it is able to resolve the conflict between the light efficiency and the thermal expansion of the light guide plate in the related art, thereby to improve the quality of the backlight source as well as the quality of the display device.

The edge-type backlight source includes a single-edge-type backlight source and a dual-edge-type backlight source. For the former, the light strip is merely arranged at one side of the back plate, i.e., the light guide plate has merely on light-entering surface. For the latter, the light strips are arranged at opposite sides of the back plate, i.e., the light guide plate has two opposite light-entering surfaces. The type of the edge-type backlight source is not particularly defined herein.

The present disclosure will be described hereinafter in conjunction with the drawings and embodiments. The following embodiments are for illustrative purposes only, but shall not be used to limit the scope of the present disclosure.

Figure 2:
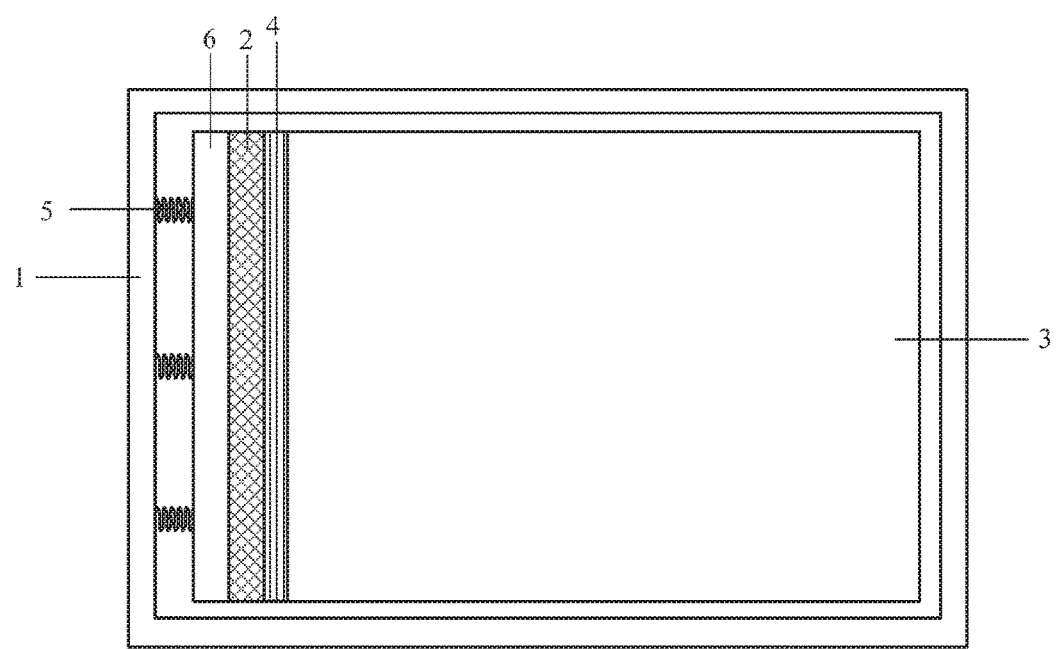
FIG. 2 is a schematic view showing an edge-type backlight source according to one embodiment of the present disclosure.
Figure 3:
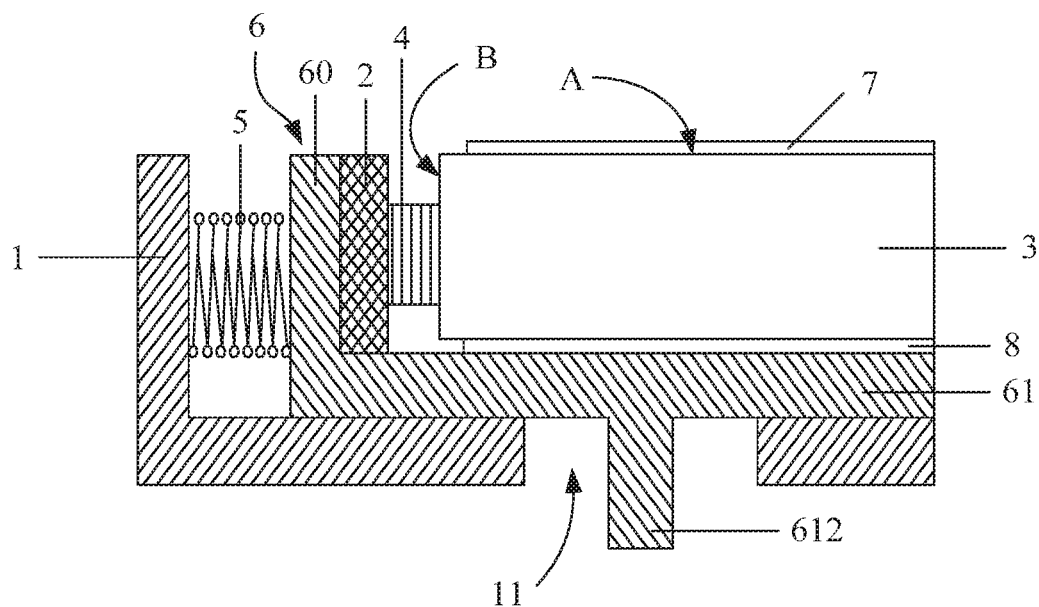
FIG. 3 is a topical, sectional view of the edge-type backlight source according to one embodiment of the present disclosure.
Figure 4:
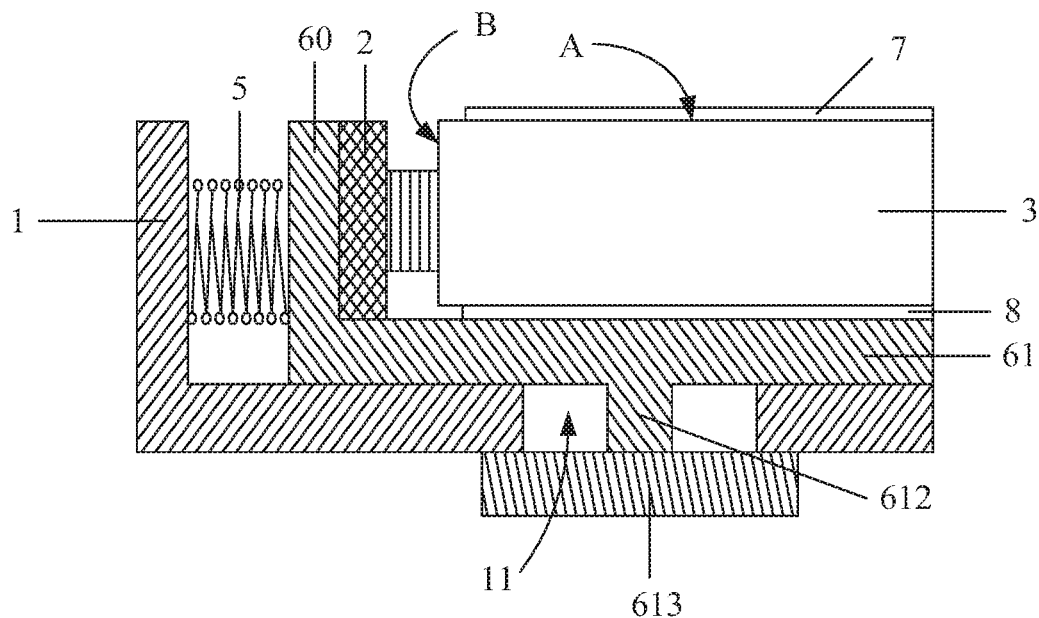
FIG. 4 is another topical, sectional view of the edge-type backlight source according to one embodiment of the present disclosure.

FIG. 2 is a schematic view showing the backlight source according to one embodiment of the present disclosure, and FIGS. 3-4 are topical, sectional views of the backlight source in FIG. 2. The drawings merely show the structure of the single-edge-type backlight source, and for the dual-edge-type backlight source, the other light strip may be arranged in a manner symmetrical to the light strip for the single-edge-type backlight source.

As shown in FIGS. 2-4, the backlight source in the embodiments of the present disclosure includes a back plate and a light strip 2 and a light guide plate 3 arranged on the back plate 1. The light guide plate 3 includes a light-exiting surface A and a light-entering surface B adjacent to the light-exiting surface A. The light strip 2 is arranged adjacent to the light-entering surface B of the light guide plate 3, and a light beam from the light strip passes through the light-entering surface B, enters the light guide plate 3 and exits the light-exiting surface A. The light guide plate 3 functions as to allow the light beam to be transmitted from an end approximate to the light strip 2 to an end away from the light strip 2. Dots may be printed on a surface of the light guide plate 3 opposite to the light-existing surface A, so as to enable the light beams to exit the light-exiting surface A uniformly, thereby to provide an area light source for a liquid crystal panel. A reflector 8 may also be arranged at aside of the light guide plate 3 opposite to the light-exiting surface A, so as to reflect the light beam toward the light-exiting surface A, thereby to improve the light utilization rate. An optical membrane 7, e.g., a brightness enhancement film or a diffusion film, is arranged at a side of the light-exiting surface A of the light guide plate 3, so as to adjust the light beam and then provide the adjusted light beam to the liquid crystal panel.

A rigid element 4, e.g., a metal spacer, is arranged between the light strip 2 and the light-entering surface B of the light guide plate 3. When an external force is applied to the rigid element 4, the rigid element 4 may be deformed slightly, and even its deformation may be omitted. One end of the rigid element 4 is fixed onto the light strip 2, and the other end thereof is fixed onto the light guide plate 3, so as to maintain a constant distance between the light strip 2 and the light-entering surface B of the light guide plate 3. This distance may be set in accordance with the light efficiency of the backlight source. An elastic element 5 is arranged between the light strip 2 and the back plate 1 and at a side of the light strip 2 opposite to the light-entering surface B of the light guide plate 3. When the light guide plate 3 is thermally deformed, a deformation force of the light guide plate 3 is applied to the rigid element 4 so as to push the light strip 2 to press against the elastic member 5. At this time, sufficient room is provided for the thermal expansion of the light guide plate 3 through the elastic deformation of the elastic element 5.

Through the arrangement of the rigid element 4 and the elastic element 5, it is able to resolve the conflict between the light efficiency and the thermal expansion of the light guide plate 3, thereby to improve the quality of the backlight source as well as the quality of the display device.

The elastic element 5 may be a spring or an elastic sheet. The light strip 2 may be a light-emitting diode (LED) strip, which includes a plurality of LED units. The LED unit has such advantages as excellent color display characteristics, long service life and being mercury-free.

In order to improve a heat dissipation effect of the backlight source, a heat dissipation plate 6 may be further arranged on the back plate 1, and the light strip 2 may be fixed onto the heat dissipation plate 6.

Alternatively, a fixation assembly may be provided so as to fix the heat dissipation plate 6, thereby to prevent the heat dissipation plate 6 to be disengaged from the back plate 1.

The fixation assembly may be of various structures. For example, the heat dissipation plate 6 may be directly adhered onto the back plate 1, or a barrier structure may be arranged at a side of the heat dissipation plate 6 away from the back plate 1, so as to prevent the heat dissipation plate 6 from being disengaged from the back plate 1.

In an alternative embodiment, as shown in FIG. 3, the heat dissipation plate 6 includes a first section 60 arranged between the light strip 2 and the back plate 1. The light strip 2 is fixed onto the first section 60 of the heat dissipation plate 6, and the elastic element 5 is arranged between the back plate 1 and the first section 60 of the heat dissipation plate 6. When the light guide plate 3 is thermally deformed, the deformation force generated by the light guide plate 3 is applied to the rigid element 4, so as to push the first section 60 of the heat dissipation plate 6 to press against the elastic element 5.

The heat dissipation plate 6 needs to move under the effect of the deformation force generated by the light guide plate 3. Hence, when the fixation assembly is used to fix the heat dissipation plate 6 so as to prevent the heat dissipation plate 6 from being disengaged from the back plate 1, the fixation assembly cannot prevent the movement of the heat dissipation plate 6, i.e., the heat dissipation plate 6 shall press against the elastic element 5 so as to provide sufficient room for the thermal expansion of the light guide plate 3.

In this regard, as shown in FIG. 3, the heat dissipation plate 6 further includes a second section 61 arranged on the back plate 1 in a contact manner. A via-hole 11 is arranged in the back plate 1 at a position corresponding to the second section 61. As shown in FIG. 4, the fixation assembly includes a delimiting column 612 fixed onto the second section 61 and a fixation member 613 fixed onto a top end of the delimiting column 612. The delimiting column 612 is arranged at a position corresponding to the via-hole 11 and passes through the via-hole 11. The top end of the delimiting column 612 is located at a side of the back plate 1 away from the heat dissipation plate 6. The fixation member 613 is lit to a shape of the via-hole 11 and configured to fix the delimiting column 612 within the via-hole 11. When the light guide plate 3 is thermally deformed, the deformation force generated by the light guide plate 3 is applied to the rigid element 4 so as to push the heat dissipation plate 6, thereby to push the delimiting column 612 to move within the via-hole 11.

To be specific, the fixation member 613 may be a nut, and the top end of the delimiting column 612 is externally threaded so as to be fit to the nut, thereby to facilitate the assembly.

Figure 6:
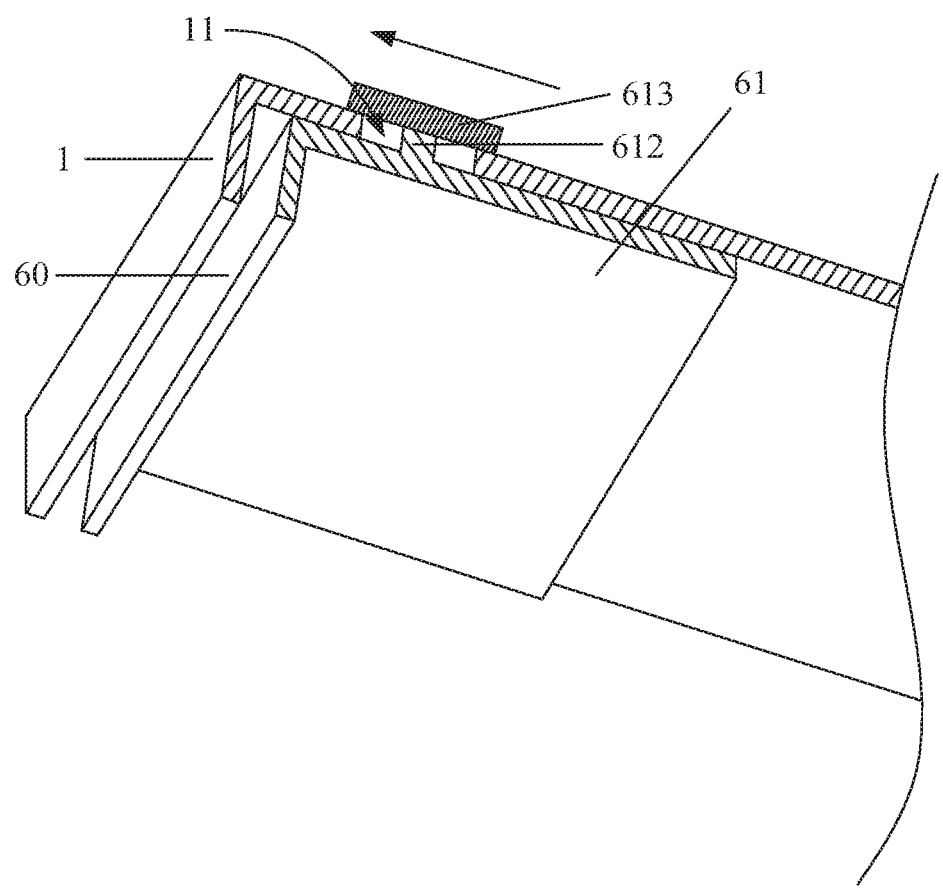
FIG. 6 is a topical schematic view showing aback plate and the heat dissipation plate according to one embodiment of the present disclosure.

The fixation member 613 is fit to the shape of the via-hole 11 and the delimiting column 612 is fixed within the via-hole 11, so as to prevent the heat dissipation plate 6 from being disengaged from the hack plate 1 in addition, the delimiting column 612 moves in the via-hole 11, so the movement of the heat dissipation plate 6 under the effect of the deformation force generated by the light guide plate 3 may not be prevented. At this time, the heat dissipation plate 6 may press against the elastic element 5, so as to provide sufficient room for the thermal expansion of the light guide plate 3, as shown in FIG. 6.

During the actual application, the delimiting column 612 may be formed integrally with the heat dissipation plate 6. At this time, the heat dissipation plate 6 has a portion located outside the back plate 1, so as to improve the heat dissipation effect.

Further, the light guide plate 3 is arranged on the second section 61 of the heat dissipation plate 6, so as to increase an area of the second section 61, thereby to improve the heat dissipation effect.

Figure 5:
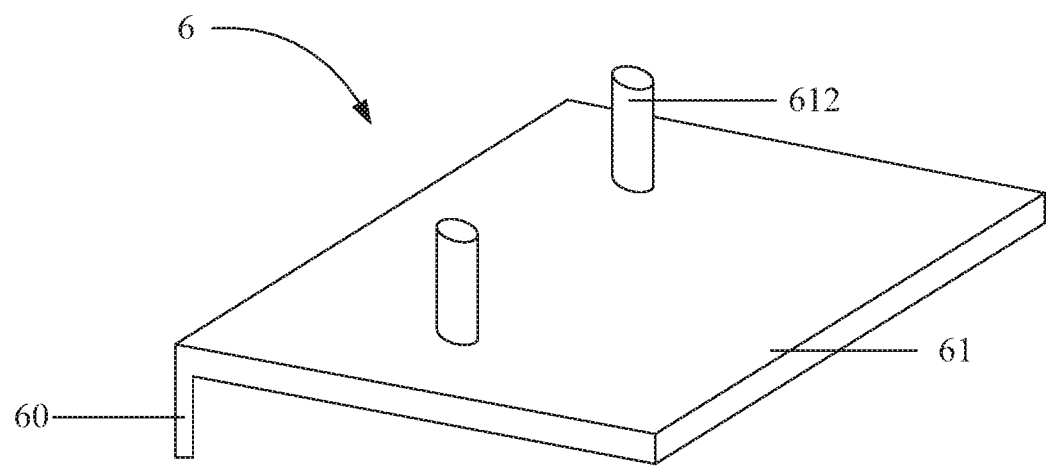
FIG. 5 is a schematic view showing a heat dissipation plate according to one embodiment of the present disclosure.

In order to firmly fix the heat dissipation plate 6 and ensure the movement of the heat dissipation plate 6 in a predetermined direction, the backlight source may include at least two fixation assemblies. For example, as shown in FIG. 5, two delimiting columns 612 may be arranged on the second section 61 of the heat dissipation plate 6, the via-holes 11 may be arranged in the back plate 1 at positions corresponding to the delimiting columns 612, and the delimiting columns 612 may be fixed within the respective via-holes 11 through the fixation assemblies.

Of course, the heat dissipation plate 6 may merely include the first section 60, without any second section 61. At this time, the delimiting column 612 may be arranged at a bottom surface of the first section 60 in contact with the back plate 1.

In another alternative embodiment, the heat dissipation plate 6 may merely include the second section 61, without any first section 60. At this time, the second section 61 is in contact with, and fixed onto, the back plate 1. The light guide plate 3 is arranged on the heat dissipation plate 6, and the light strip 2 is slidably arranged on the heat dissipation plate 6. When the light guide plate 3 is thermally deformed, the deformation force generated by the light guide plate 3 is applied to the rigid element 4, so as to push the light strip 2 to move on the heat dissipation plate 6, thereby to enable the light strip 2 to press against the elastic element 5 and provide sufficient room for the thermal expansion of the light guide plate 3. Here, the heat dissipation plate 6 may be directly adhered onto the back plate 1.

As shown in FIGS. 2 and 3, the backlight source in the embodiments of the present disclosure includes the back plate 1, the light strip 2 and the light guide plate 3 arranged on the back plate 1, the rigid element 4 arranged between the light strip 2 and the light-entering surface B of the light guide plate 3, the elastic element 5 arranged between the light strip 2 and the back plate 1, the heat dissipation plate 6, the two fixation assemblies, the reflector 8 and the optical membrane 7.

The light guide plate 3 includes the light-exiting surface A and the light-entering surface B adjacent to the light-exiting surface A, and the dots may be printed on the surface of the light guide plate 3 opposite to the light-exiting surface A. The light strip 2 is arranged adjacent to the light-entering surface B of the light guide plate 3, and the light beam from the light strip 2 passes through the light-entering surface B, enters the light guide plate 3 and exits the light-exiting surface A. One end of the rigid element 4 is fixed onto the light strip 2, and the other end of the rigid element 4 is fixed onto the light guide plate 3, so as to maintain a constant distance between the light strip 2 and the light-entering surface B of the light guide plate 3. The elastic element 5 is arranged at a side of the light strip 2 opposite to the light-entering surface B of the light guide plate 3.

The heat dissipation plate 6 may include the first section 60 and the second section 61. The second section 61 is arranged, in a contact manner, on the back plate 1, and the light guide plate 3 is arranged on the second section 61. The light strip 2 is fixed onto the first section 60, the first section 60 is arranged between the light strip 2 and the back plate 1, and the elastic element 5 is arranged between the back plate 1 and the first section 60. When the light guide plate 3 is thermally deformed, the deformation force generated by the light guide plate 3 is applied to the rigid element 4, so as to push the first section 60 to press against the elastic element 5, thereby to provide sufficient room for the thermal expansion of the light guide plate 3 through the elastic deformation of the elastic element 5. The fixation assembly may include the delimiting column 612 fixed onto the second section 61 and the nut 613 fit to the delimiting column 612. The via-hole 11 is arranged in the back plate 1 at a position corresponding to the delimiting column 612, and the delimiting column 612 passes through the via-hole 11. The top end of the delimiting column 612 is located at aside of the back plate 1 away from the heat dissipation plate 6, and externally threaded. The nut 612 is screwed into the top end of the delimiting column 612, and it is fit to the shape of the via-hole 11, so as to fix the delimiting column 612 within the via-hole 11, thereby to prevent the heat dissipation plate 6 from being disengaged from the back plate 1. When the light guide plate 3 is thermally deformed, the deformation force generated by the light guide plate 3 is applied to the rigid element 4, so as to push the heat dissipation plate 6, thereby to enable the delimiting column 612 to move in the via-hole 11.

The reflector 8 may be arranged at a side of the light guide plate 3 opposite to the light-exiting surface A, and the optical membrane 7 may be arranged at aside of the light guide plate 3 adjacent to the light-exiting surface A.

The present disclosure further provides in some embodiments a display device including the above-mentioned backlight source, so as to improve the product quality. The display device may be any product or member having a display function, such as a liquid crystal panel, an electronic paper, a mobile phone, a flat-panel computer, a television, a display, a laptop computer, a digital photo frame or a navigator.

According to the embodiments of the present disclosure, the rigid element is arranged between the light strip and the light-entering surface of the light guide plate. One end of the rigid element is fixed onto the light strip, and the other end is fixed onto the light guide plate, so as to maintain a constant distance between the light strip and the light-entering surface of the light guide plate, thereby to ensure the light efficiency of the backlight source. In addition, the elastic element is arranged between the light strip and the back plate and at a side of the light strip opposite to the light-entering surface of the light guide plate. When the light guide plate is thermally deformed, the deformation force generated by the light guide plate is applied to the rigid element, so as to push the light strip to press against the elastic element, thereby to enable the elastic element to be deformed. As a result, it is able to provide sufficient room for the thermal expansion of the light guide plate while ensuring the high light efficiency, thereby to improve the quality of the backlight source as well as the quality of the display device.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A backlight source, comprising a back plate, and a light strip, a heat dissipation plate, and a light guide plate which are arranged on the back plate,
   wherein the light guide plate comprises a light-exiting surface and a light-entering surface adjacent to the light-exiting surface;
   the light strip is arranged adjacent to the light-entering surface of the light guide plate;
   a rigid element is arranged between the light strip and the light-entering surface of the light guide plate, one end of the rigid element is fixed onto the light strip, and the other end of the rigid element is fixed onto the light guide plate to maintain a constant distance between the light strip and the light-entering surface of the light guide plate;
   an elastic element is arranged between the light strip and the back plate and at a side of the light strip opposite to the light-entering surface of the light guide plate; and
   the heat dissipation plate comprises a first section arranged between the light strip and the back plate, wherein the light strip is fixed onto the first section of the heat dissipation plate, and the elastic element is arranged between the back plate and the first section of the heat dissipation plate;
   the rigid element and the first section of the heat dissipation plate are respectively fixed on the light-exiting surface of the light strip and a surface of the light strip opposite to the light-exiting surface of the light strip,
   when the light guide plate is thermally deformed, a deformation force generated by the light guide plate is applied to the rigid element to push the light strip to press against the elastic element.

2. The backlight source according to claim 1, further comprising:
   a fixation assembly configured to fix the heat dissipation plate to prevent the heat dissipation plate from being disengaged from the back plate.

3. The backlight source according to claim 2, wherein the heat dissipation plate further comprises a second section arranged on the back plate in a contact manner, and a via-hole is arranged in the back plate at a position corresponding to the second section;
   the fixation assembly comprises a delimiting column fixed onto the second section and a fixation member fixed onto a top end of the delimiting column;
   the delimiting column is arranged at a position corresponding to the via-hole and passes through the via-hole;
   the top end of the delimiting column is located at a side of the back plate away from the heat dissipation plate;
   the fixation member is fit to a shape of the via-hole and configured to fix the delimiting column within the via-hole; and
   when the light guide plate is thermally deformed, the deformation force generated by the light guide plate is applied to the rigid element to push the heat dissipation plate, thereby to push the delimiting column to move within the via-hole.

4. The backlight source according to claim 3, wherein the light guide plate is arranged on the second section of the heat dissipation plate.

5. The backlight source according to claim 3, wherein the fixation member is a nut, and the top end of the delimiting column is externally threaded to be fit to the nut.

6. The backlight source according to claim 3, wherein the delimiting column and the heat dissipation plate are formed integrally.

7. The backlight source according to claim 1, wherein the elastic element is a spring or an elastic sheet.

8. The backlight source according to claim 1, wherein the rigid element is a metal spacer.

9. The backlight source according to claim 1, further comprising:
   an optical membrane arranged at a side of the light-exiting surface of the light guide plate; and
   a reflector arranged at a side of the light guide plate opposite to the light-exiting surface.

10. A display device, comprising the backlight source according to claim 1.

11. The display device according to claim 10, wherein the backlight source further comprises:
    a heat dissipation plate arranged on the back plate and comprising a first section arranged between the light strip and the back plate,
    wherein the light strip is fixed onto the first section of the heat dissipation plate, and the elastic element is arranged between the back plate and the first section of the heat dissipation plate.

12. The display device according to claim 11, wherein the backlight source further comprises:
    a fixation assembly configured to fix the heat dissipation plate to prevent the heat dissipation plate from being disengaged from the back plate.

13. The display device according to claim 12, wherein the heat dissipation plate further comprises a second section arranged on the back plate in a contact manner, and a via-hole is arranged in the back plate at a position corresponding to the second section;
    the fixation assembly comprises a delimiting column fixed onto the second section and a fixation member fixed onto a top end of the delimiting column;
    the delimiting column is arranged at a position corresponding to the via-hole and passes through the via-hole;
    the top end of the delimiting column is located at a side of the back plate away from the heat dissipation plate;
    the fixation member is fit to a shape of the via-hole and configured to fix the delimiting column within the via-hole; and
    when the light guide plate is thermally deformed, the deformation force generated by the light guide plate is applied to the rigid element to push the heat dissipation plate, thereby to push the delimiting column to move within the via-hole.

14. The display device according to claim 13, wherein the light guide plate is arranged on the second section of the heat dissipation plate.

15. The display device according to claim 13, wherein the fixation member is a nut, and the top end of the delimiting column is externally threaded to be fit to the nut.

16. The display device according to claim 13, wherein the delimiting column and the heat dissipation plate are formed integrally.

17. The display device according to claim 10, wherein the elastic element is a spring or an elastic sheet.

18. The display device according to claim 10, wherein the rigid element is a metal spacer.

19. The display device according to claim 10, wherein the backlight source further comprises:
   an optical membrane arranged at a side of the light-exiting surface of the light guide plate; and
   a reflector arranged at a side of the light guide plate opposite to the light-exiting surface.

* * * * *